United States Patent
Cao et al.

(10) Patent No.: US 11,264,804 B2
(45) Date of Patent: Mar. 1, 2022

(54) CIRCUIT FOR COMPONENT VOLTAGE LIMITATION, AND APPARATUS FOR APPLYING THE SAME

(71) Applicant: SUNGROW POWER SUPPLY CO., LTD., Anhui (CN)

(72) Inventors: Renxian Cao, Anhui (CN); Zongjun Yang, Anhui (CN)

(73) Assignee: SUNGROW POWER SUPPLY CO., LTD., Anhui (CN)

( * ) Notice: Subject to any disclaimer, the term of this patent is extended or adjusted under 35 U.S.C. 154(b) by 0 days.

(21) Appl. No.: 16/652,268

(22) PCT Filed: May 13, 2019

(86) PCT No.: PCT/CN2019/086553
§ 371 (c)(1),
(2) Date: Aug. 20, 2020

(87) PCT Pub. No.: WO2020/164197
PCT Pub. Date: Aug. 20, 2020

(65) Prior Publication Data
US 2021/0367427 A1    Nov. 25, 2021

(30) Foreign Application Priority Data
Feb. 14, 2019    (CN) .......................... 201910114373.4

(51) Int. Cl.
*H02J 3/38*    (2006.01)
*H02S 40/34*   (2014.01)

(52) U.S. Cl.
CPC ................ *H02J 3/38* (2013.01); *H02S 40/34* (2014.12); *H02J 2300/26* (2020.01)

(58) Field of Classification Search
CPC .......... H02J 3/38; H02J 2300/26; H02S 40/34
See application file for complete search history.

(56) References Cited

U.S. PATENT DOCUMENTS

| | | |
|---|---|---|
| 2012/0242391 A1 | 9/2012 | Fan |
| 2015/0200623 A1 | 7/2015 | Kang et al. |

(Continued)

FOREIGN PATENT DOCUMENTS

| | | |
|---|---|---|
| CN | 101984546 A | 3/2011 |
| CN | 104969139 A | 10/2015 |

(Continued)

OTHER PUBLICATIONS

International Search Report for International Application PCT/CN2019/086553; dated Nov. 19, 2019.

(Continued)

*Primary Examiner* — Robert L Deberadinis
(74) *Attorney, Agent, or Firm* — Cantor Colburn LLP (57) ABSTRACT

A circuit for component voltage limitation and an apparatus for applying the same. A detection-and-control unit detects a parameter of a photovoltaic-cell string, and controls operation of a switch unit according to the parameter. In a case that the switch unit controls at least one photovoltaic cell connected to the switch unit to operate in a voltage-limited mode according to control of the detection-and-control unit, a voltage of the photovoltaic-cell string can be reduced. In a case that that the switch unit controls a photovoltaic cell operating in a voltage-limited mode to resume a normal output according to control of the detection-and-control unit, an output voltage of the photovoltaic-cell string can be increased. The rate of utilization on the direct voltage and the PVIR of DC/AC are improved for the photovoltaic system.

19 Claims, 8 Drawing Sheets

(56) References Cited

U.S. PATENT DOCUMENTS

2015/0349583 A1  12/2015  Yamada et al.
2015/0349709 A1  12/2015  Ponec et al.
2018/0083450 A1   3/2018  Truong et al.

FOREIGN PATENT DOCUMENTS

| CN | 105356511 A |  2/2016 |
| CN | 106256086 A | 12/2016 |
| CN | 107528340 A | 12/2017 |
| CN | 107872196 A |  4/2018 |
| CN | 108615777 A | 10/2018 |
| CN | 108900157 A | 11/2018 |

OTHER PUBLICATIONS

CNIPA 1st Office Action for corresponding CN Application No. 201910114373.4; dated Jan. 5, 2021.
CNIPA Second Office Action for corresponding CN Application No. 201910114373.4; dated, Jun. 25, 2021.

CIRCUIT FOR COMPONENT VOLTAGE LIMITATION, AND APPARATUS FOR APPLYING THE SAME

CROSS REFERENCE TO RELATED APPLICATIONS

This application is the national phase of International Application No. PCT/CN2019/086553, titled "CIRCUIT FOR COMPONENT VOLTAGE LIMITATION, AND APPARATUS FOR APPLYING THE SAME", filed on May 13, 2019, which claims priority to Chinese Patent Application No. 201910114373.4, titled "CIRCUIT FOR COMPONENT VOLTAGE LIMITATION, AND APPARATUS FOR APPLYING THE SAME", filed on Feb. 14, 2019 with China National Intellectual Property Administration, which is incorporated herein by reference in its entirety.

FIELD

The present disclosure relates to the technical field of power electronics, and particularly, to a circuit for component voltage limitation, and an apparatus for applying the circuit.

BACKGROUND

A photovoltaic power generation system mainly includes a photovoltaic module and an inverter. Multiple photovoltaic modules are connected in series and in parallel, and send a direct voltage into the inverter. The direct voltage is converted into an alternate voltage by the inverter, and the alternate voltage is supplied to a grid or a load.

As a power level of the inverter increases, more photovoltaic modules are connected into a system, and a cost of the system is reduced. A maximum voltage of the system is required to be no higher than 1500V for series connection of multiple photovoltaic modules. Thereby, a quantity of photovoltaic modules in the series connection is limited.

Figure 1:
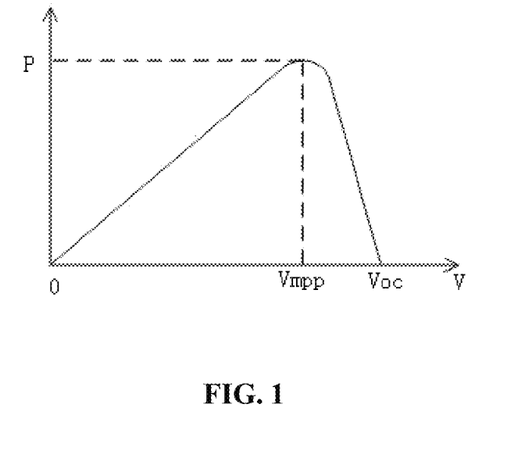
FIG. 1 is a graph of an output characteristic curve of a photovoltaic module in conventional technology.

An output power of a photovoltaic module keeps changing with a voltage. As shown in FIG. 1, an output voltage Vmpp corresponding to a maximum power point is usually about 80% of an open circuit voltage Voc. Taking a system of 1500V as an example, a voltage at a direct-current side of the inverter gradually reaches and keeps 1200V in operation. Therefore in practice, an effective rate of utilization for the direct voltage of the system, and a PV-to-inverter ratio of DC/AC are both low for the photovoltaic module and the inverter.

SUMMARY

In view of the above, a circuit for component voltage limitation, and an apparatus and a system for applying the same are provided according to embodiments of the present disclosure. An objective is to address an issue that a quantity of components in series connection is limited and rate of utilization on a direct voltage of a system is low in conventional technology.

To achieve the above objective, following technical solutions are provided according to embodiments of the present disclosure.

According to an aspect of the present disclosure, a circuit for component voltage limitation is provided, where the circuit is connected to a photovoltaic-cell string, the photovoltaic-cell string includes multiple photovoltaic cells connected in series, each of the multiple photovoltaic cells is a photovoltaic-cell sheet, a photovoltaic sub-string, or a photovoltaic module, and the circuit includes a detection-and-control unit and a switch unit;

the detection-and-control unit is configured to detect a parameter of the photovoltaic-cell string, and control operation of the switch unit according to the parameter of the photovoltaic-cell string; and the switch unit is configured to control, according to control of the detection-and-control unit, at least one photovoltaic cell connected to the switch unit to operate in a voltage-limited mode, or a photovoltaic cell operating in the voltage-limited mode to resume a normal output.

Preferably, the voltage-limited mode includes: a complete-short mode in which an output voltage is zero, or a chopping mode in which an output voltage is controlled based on pulse width modulation (PWM).

Preferably, the detection-and-control unit includes a detection module and a controller, where:

the controller is a comparator provided with a hysteresis feedback, and is configured to control the switch unit between being normally-on and being turned off; or the controller is a PWM generator or a PWM processor, and is configured to control the switch unit among being normally-on, being on or off based on PWM, and being turned off.

Preferably, the parameter of the photovoltaic-cell string is a voltage, a current, or temperature of the photovoltaic-cell string, or is a voltage, a current, or temperature of the at least one photovoltaic cell.

Preferably, the switch unit includes a switch, where:

the switch is connected in parallel with the at least one photovoltaic cell, in a case a quantity of the at least one photovoltaic cell is one; and the switch is connected in parallel with multiple photovoltaic cells connected in series, in a case the at least one photovoltaic cell is the multiple photovoltaic cells connected in series.

Preferably, the switch unit includes n switches, in a case that a quantity of the at least one photovoltaic cell is n, where n is a positive integer greater than 1, and the n switches and the at least one photovoltaic cell are in a one-to-one correspondence, and each of the n switches is connected in parallel to a corresponding one of the at least one photovoltaic cell.

Preferably, the circuit for component voltage limitation further includes a power module, configured to power the detection-and-control unit; and the power module extracts power from the photovoltaic-cell string, from a part of the photovoltaic-cell string, or from outside.

According to another aspect of the present disclosure, an intelligent apparatus for voltage limitation is also provided, including the aforementioned circuit for component voltage limitation, where a photovoltaic cell connected to the circuit for component voltage limitation is the photovoltaic module.

According to another aspect of the present disclosure, an intelligent junction box for voltage limitation is further provided, including: multiple diodes, and any aforementioned circuit for component voltage limitation, where:

a photovoltaic cell connected to the circuit for component voltage limitation is a photovoltaic sub-string; and each of the multiple diodes is connected in anti-parallel with a corresponding one of the photovoltaic sub-string.

According to another aspect of the present disclosure, an intelligent component is further provided, including: a photovoltaic module, and the aforementioned intelligent junction box for voltage limitation.

The circuit for component voltage limitation is provided according to an embodiment of the present disclosure. The detection-and-control unit detects the parameter of the photovoltaic-cell string, and controls operation of the switch unit according to the parameter of the photovoltaic-cell string. The switch unit controls, according to control of the detection-and-control unit, the at least one photovoltaic cell connected to the switch unit to operate in the voltage-limited mode, or the photovoltaic cell operating in the voltage-limited mode to resume the normal output. In a case that the switch unit controls the at least one photovoltaic cell connected to the switch unit to operate in the voltage-limited mode according to control of the detection-and-control unit, a voltage of the photovoltaic-cell string can be reduced. Thereby, a quantity of photovoltaic modules connected in series can be increased while the highest voltage of the system is guaranteed not to exceed a corresponding requirement, and a cost of the system is reduced. In a case that that the switch unit controls the photovoltaic cell operating in the voltage-limited mode to resume the normal output according to control of the detection-and-control unit, an output voltage of the photovoltaic-cell string can be increased. Thereby, the rate of utilization on the direct voltage and the PV-to-inverter ratio of DC/AC are improved for the photovoltaic system.

DETAILED DESCRIPTION OF EMBODIMENTS

For better understanding of the present disclosure, hereinafter preferable implementations of the present disclosure are described in conjunction with embodiments. It should be appreciated that following description is merely intended to further describe the present disclosure, instead of limiting claims of the present disclosure.

A circuit for component voltage limitation is provided according to a first embodiment of the present disclosure, so as to address an issue that a quantity of components in series connection is limited and rate of utilization on a direct voltage of a system is low in conventional technology.

The circuit for component voltage limitation is connected to a photovoltaic-cell string, and a specific connection manner is determined based on an application environment thereof. The photovoltaic-cell string includes multiple photovoltaic cells connected in series. The photovoltaic cell may be a photovoltaic-cell sheet, a photovoltaic sub-string or a photovoltaic module. A type is determined based on an application environment, and all fall within the protection scope of the present disclosure. Generally, the photovoltaic-cell sheet refers to a smallest unit for generating photovoltaic power, and a single photovoltaic-cell sheet may output a voltage ranging from 0.3V to 0.7V. Multiple photovoltaic-cell sheets, such as 10, 12 or 20 photovoltaic-cell sheets, are connected in series via a bus-bar to form a photovoltaic sub-string. Multiple photovoltaic sub-strings are further connected in series to form a photovoltaic module. A conventional photovoltaic module may include 60 sheets, 72 sheets, or multiple half-sheets. In practice, the circuit for component voltage limitation may be connected between two terminals of multiple photovoltaic-cell sheets, or two terminals of multiple photovoltaic sub-strings, or two terminals of multiple photovoltaic modules.

Figure 2:
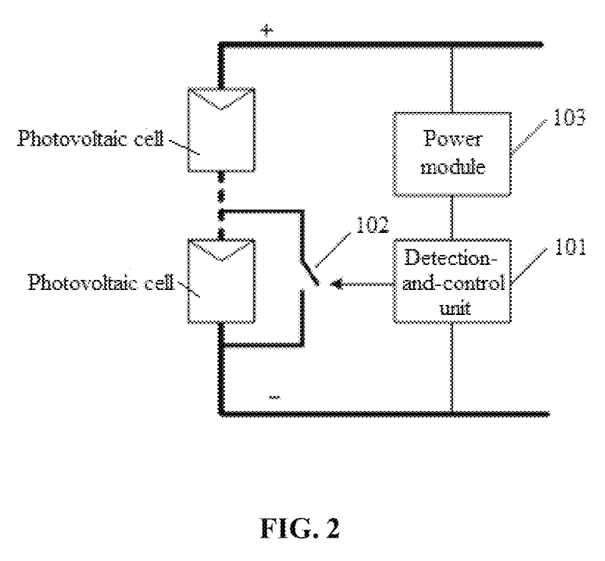
FIGS. 2 and 3A to 3E are schematic structural diagrams of a circuit for component voltage limitation according to an embodiment of the present disclosure.
Figure 3A:
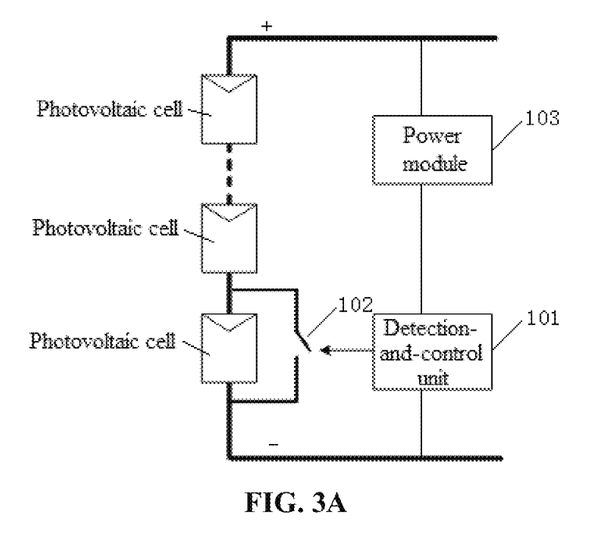
Figure 3B:
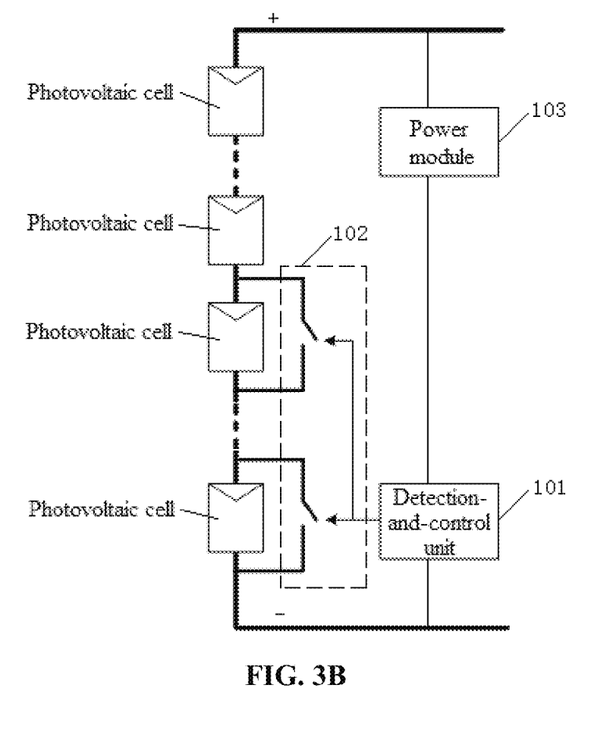
Figure 3C:
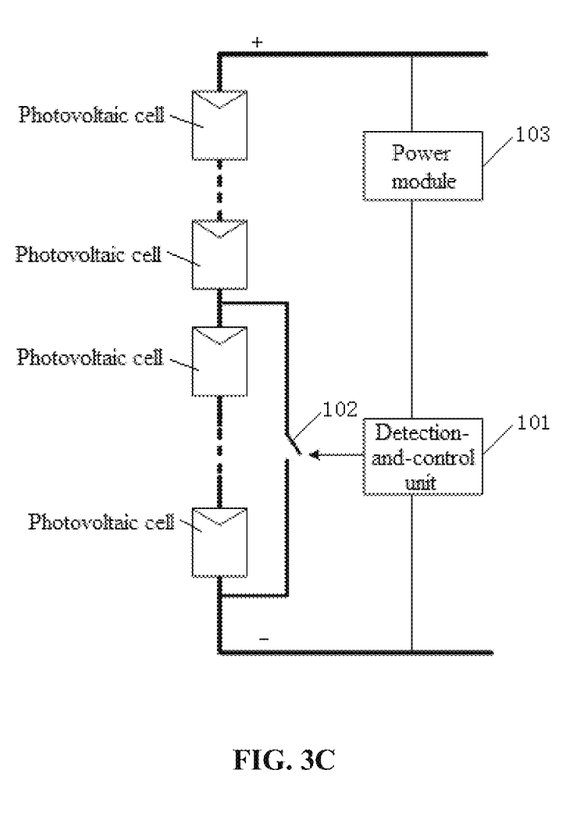
Figure 3D:
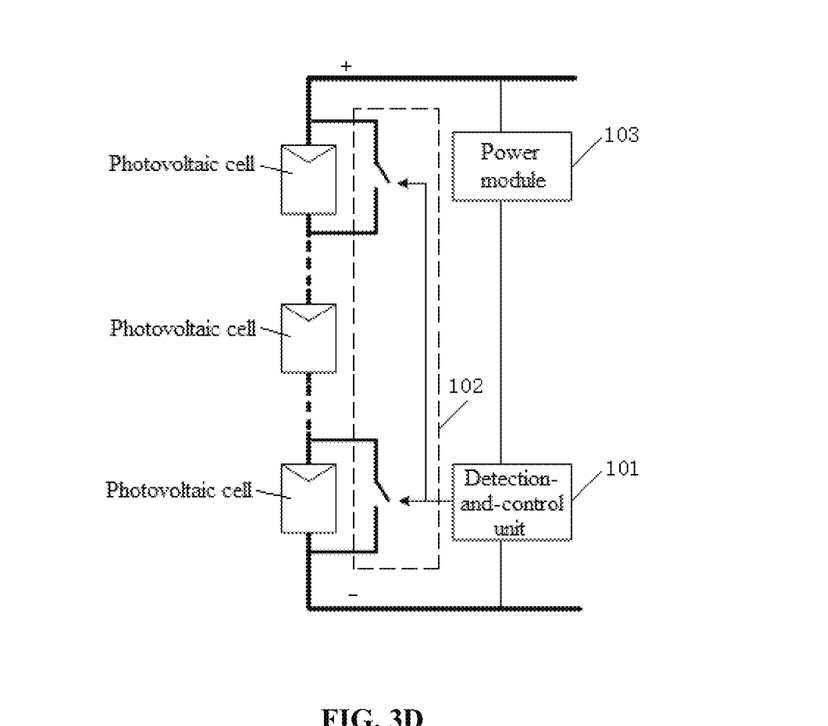
Figure 3E:
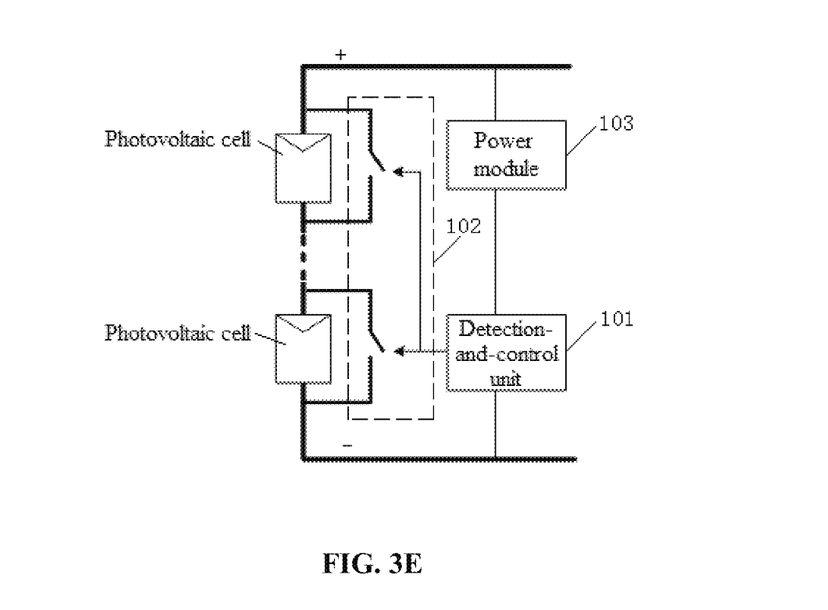

As shown in FIGS. 2 to 3E, the circuit for component voltage limitation includes a control unit 101, and a switch unit 102.

Figure 6:
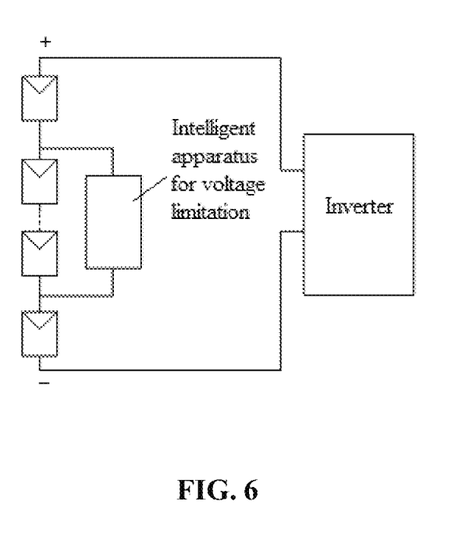
FIG. 6 is a schematic structural diagram of a photovoltaic power generation systems including an independent intelligent apparatus for voltage limitation according to an embodiment of the present disclosure.
Figure 7:
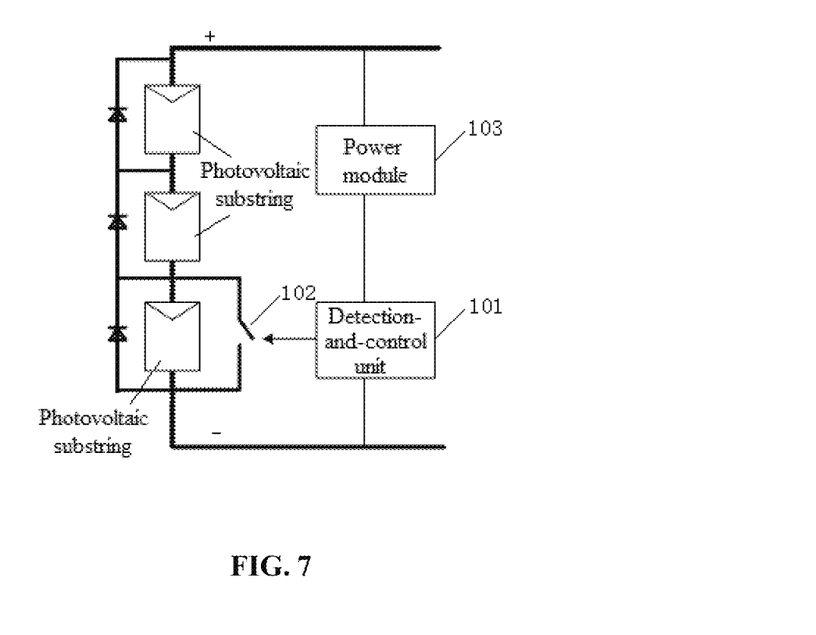
FIG. 7 is a schematic structural diagram of an intelligent junction box for voltage limitation according to an embodiment of the present disclosure.

The switch unit 102 is implemented in different manners for different types of connection between the circuit for component voltage limitation and the photovoltaic-cell string. For example, in a case that the circuit for component voltage limitation is connected to a photovoltaic cell in the photovoltaic-cell string, the switch unit 102 is a switch connected in parallel with the photovoltaic cell, as shown in FIG. 3A. In a case that the circuit for component voltage limitation is connected to photovoltaic cells connected in series as a part of the photovoltaic-cell string, the switch unit 102 may be multiple switches connected in parallel with the photovoltaic cells in a one-to-one correspondence, as shown in FIG. 3B, or may be a switch connected in parallel with all corresponding photovoltaic cells, as shown in FIG. 6c. In a case that the circuit for component voltage limitation is connected to multiple photovoltaic cells which are not connected in the photovoltaic-cell string, the switch unit 102 includes multiple switches connected in parallel with the photovoltaic cells in a one-to-one correspondence, as shown in FIG. 3D. In a case that the circuit for component voltage limitation is connected to all photovoltaic cells in the photovoltaic-cell string, the switch unit 102 includes multiple switches connected in parallel with all the photovoltaic cells in a one-to-one correspondence, as shown in FIG. 3E.

Therefore, the switch unit 102 may include only one switch. As shown in FIG. 3A, the switch is connected in parallel with the corresponding photovoltaic cell, in a case that a quantity of the photovoltaic cell connected to the switch unit 102 is one. As shown in FIG. 3C, the switch is connected in parallel with multiple photovoltaic cells connected in series, in a case that the photovoltaic cell connected to the switch unit 102 is multiple photovoltaic cells connected in series. The switch unit 102 includes n switches, in a case that a quantity of the at least one photovoltaic cell is n, and n is a positive integer greater than 1. In such case, each of the n switches is connected in parallel to a corresponding one of the n photovoltaic cells, and the n switches and the n corresponding photovoltaic cells are in a one-to-one correspondence, as shown in FIGS. 3B, 3D and 3E.

The aforementioned cases may be combined with each other. The combinations are not further described herein, and all fall within the protection scope of the present disclosure.

In practice, the switch is preferably a controllable electronic switch, such as MOSFET (metal-oxide-semiconductor field-effect transistor), IGBT (insulated gate bipolar transistor), a triode, a relay, or the like. A type of the switch depends on an application environment, and all fall within the protection scope.

The detection-and-control unit 101 is configured to detect the parameter of the photovoltaic-cell string, and control operation of the switch unit 102 according to the parameter of the photovoltaic-cell string. Different parameters are detected by the detection-and-control unit 101 for different types of connection between the circuit for component voltage limitation and the photovoltaic-cell string. The parameter may be a parameter corresponding to the entire photovoltaic-cell string, a parameter corresponding to a representative photovoltaic cell, or a parameter corresponding to a photovoltaic cell connected to the circuit for component voltage limitation. A selection depends on a specific application environment, and all fall within the protection scope of the present disclosure. In addition, the parameter may be a voltage, a current, or temperature, which all fall within the protection scope of the present disclosure, as long as it is capable to reflect an output state of the photovoltaic-cell string.

The output state of the photovoltaic-cell string includes a state requiring voltage limitation and a state requiring voltage boost. The state requiring voltage limitation means that a direct voltage of the system is higher than an upper limit due to a high output voltage of the photovoltaic-cell string, for example, an output state before an inverter is connected to a grid. The state requiring voltage boost means that a direct voltage of the system is lower than a lower limit, for example, an output state due to an MPPT (Maximum Power Point Tracking) control after an inverter is connected to a grid.

The detection-and-control unit 101 may control operation of the switch unit 102, thereby control at least one photovoltaic cell connected thereto to operate in a voltage-limited mode, in a case that the parameter of the photovoltaic-cell string characterizes that a direct voltage of a system is greater than an upper limit, namely, in a case that a condition for enabling voltage limitation is satisfied. The voltage-limited mode is, for example, a complete-short mode in which an output voltage is zero, or a chopping mode in which an output voltage is controlled based on pulse width modulation (PWM). The detection-and-control unit 101 may further control to turn off the switch unit 102, and thereby control a photovoltaic cell operating in the voltage-limited mode to resume a normal output, in a case that the parameter of the photovoltaic-cell string characterizes that a direct voltage of a system is smaller than a lower limit, namely, in a case that a condition for suspending voltage limitation is satisfied.

An output voltage of the corresponding photovoltaic cell can be limited in both the complete-short mode in which the output voltage is zero, and the chopping mode in which the output voltage is controlled based on pulse width modulation (PWM). Thereby, an output voltage of the entire photovoltaic-cell string can be reduced. The output voltage of the entire photovoltaic-cell string can be increased in a case that the photovoltaic cell operating in the voltage-limited mode resumes the normal output.

It can be seen from the above that the circuit for component voltage limitation is provided according to this embodiment of the present disclosure. In a case that the direct voltage of the system is greater than the upper limit and needs to be limited before inverter is connected to the grid, the detection-and-control unit 101 controls operation of the switch unit 102, and thereby controls the at least one photovoltaic cell connected thereto to operate in the voltage-limited mode, and the voltage of the photovoltaic-cell string is reduced. Thereby, the quantity of photovoltaic modules connected in series can be increased while the highest voltage of the system is guaranteed not to exceed a corresponding requirement. Connections for components are expanded at a direct-current side, and a cost of the system is reduced. In a case that the direct voltage of the system is smaller than the lower limit and needs to be increased after the inverter is connected to the grid, the detection-and-control unit 101 controls to turn off the switch unit 102, and thereby controls the photovoltaic cell operating in the voltage-limited mode to resume the normal output, and the output voltage of the photovoltaic-cell string is increased. Thereby, the rate of utilization on the direct voltage and the PVIR (PV-to-inverter ratio) of DC/AC are effectively improved for the photovoltaic system.

Based on the foregoing embodiment, a specific circuit for component voltage limitation is further provided according to another embodiment of the present disclosure. Preferably, the circuit further includes a power module 103 configured to power the detection-and-control unit 101, as shown in FIGS. 2 to 3E.

In practice, the power module 103 may obtain power from the photovoltaic-cell string (as shown in FIGS. 2 to 3E), from a part of the photovoltaic-cell string (not shown in figures), or from outside (not shown in figures). A manner of obtaining power depends on an application environment and is not specifically limited herein, and all fall within the protection scope of the present disclosure.

A circuit of the power module 103 may be implemented as a conventional LDO (low dropout regulator), a half bridge circuit, or a flyback circuit. A type of the circuit depends on an application environment and is not specifically limited herein, and all fall within the protection scope of the present disclosure.

Preferably, the detection-and-control unit 101 includes a detection module and a controller. The controller in the detection-and-control unit 101 may be implemented in two different manners, based on a specific condition of the detection-and-control unit 101 controlling an operation state of the switch unit 102.

Figure 4:
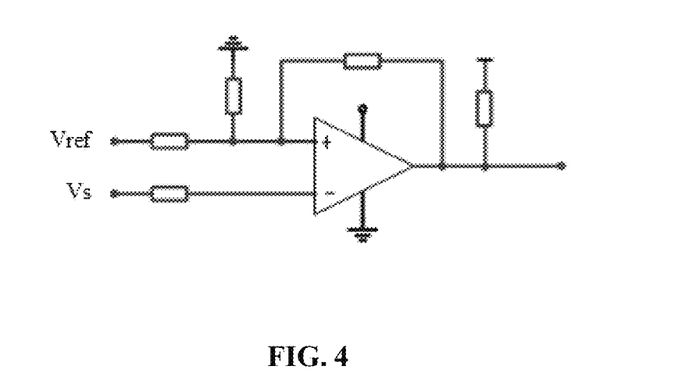
FIG. 4 is a schematic structural diagram of a controller according to an embodiment of the present disclosure.

In a first manner, the controller may include a comparator with hysteresis feedback, as shown in FIG. 4. The control switch unit 102 is controlled to be normally-on, in a case that the parameter (such as a voltage Vs) outputted by the detection module exceeds a corresponding upper limit (such as a reference voltage Vref) and thereby satisfies the condition for enabling voltage limitation. The control switch unit 102 is controlled to be turned off, in a case that the parameter outputted by the detection module satisfies the condition for suspending voltage limitation. A cost for implementing such controller is low.

Figure 5A:
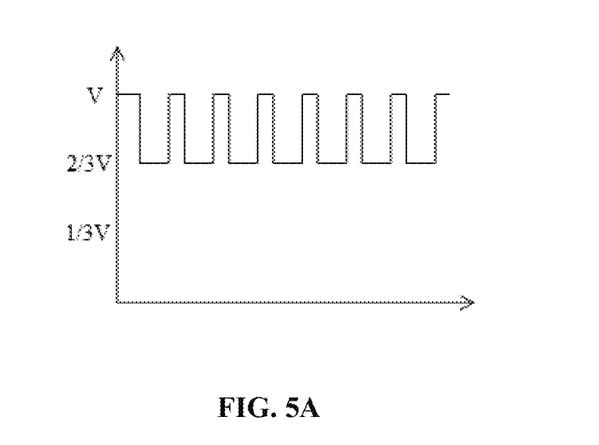
FIGS. 5A and 5B are schematic waveform diagrams of a chopping mode according to an embodiment of the present disclosure.

In a second manner, the controller may be a PWM generator or processor. The controller is configured to control the switch unit 102 to be normally-on, or to be on or off based on the PMW, in a case that the parameter outputted from the detection module satisfies a condition for enabling voltage limitation. The controller is further configured to control the switch unit 102 to be turned off, in a case that the parameter outputted from the detection module satisfies a condition for suspending voltage limitation. A waveform of a voltage outputted by the corresponding photovoltaic string is changed into a rectangular wave (as shown in FIG. 5A), in a case that the switch unit 102 is controlled to switch between on and off under a high frequency. The output is further changed into a saw-toothed wave with a ripple, because there is a capacitance of the power module 103 between two terminals of a module. Moreover, the photovoltaic modules are connected in series and then output to an inverter side. Due to a phase difference among photovoltaic modules and an input capacitance at the inverter side, an overall output voltage of the photovoltaic string is smoother. Hence, the chopping mode is also capable to reduce the output voltage of the entire photovoltaic-cell string can also be reduced, and a degree of adjustment is more fine. An output of the corresponding photovoltaic cell may be controlled with a certain duty ratio. Preferably, a chopping frequency is higher than a preset frequency, reducing magnitude of the ripple.

Rest of the structure and principles are same as those in the foregoing embodiment, and are not described again herein.

An intelligent apparatus for voltage limitation is further provided in another embodiment of the present disclosure. The intelligent apparatus is applied to the photovoltaic power generation system as shown in FIG. 6. A photovoltaic string of the photovoltaic power generation system includes multiple conventional photovoltaic modules connected in series. In the photovoltaic string, a part of the photovoltaic modules may be provided with the intelligent apparatus for voltage limitations. For example, the photovoltaic modules are connected in parallel with the intelligent apparatuses for voltage limitation in a one-to-one correspondence (not shown in figures). Alternatively, the multiple photovoltaic modules connected in series as a whole are connected in parallel with an intelligent apparatus for voltage limitation (as shown in FIG. 6). Alternatively, each photovoltaic module may be provided with a corresponding intelligent apparatus for voltage limitation connected in parallel with said photovoltaic module (not shown in figures).

The intelligent apparatus for voltage limitation includes the circuit for component voltage limitation according to any aforementioned embodiment, and reference may be made to the aforementioned embodiment for a specific structure and a principle. The photovoltaic power generation system shown in FIG. 6 is taken as an example. It is required that a voltage inputted to the direct-current side of the inverter does not exceed 1500V. Before the inverter is connected to the grid, the intelligent apparatus for voltage limitation limits the output voltage of the photovoltaic module connected thereto, so that the total output of the photovoltaic string does not exceed 1500V. After the inverter is connected to the grid, the bus voltage at the direct-current side of the inverter is reduced to about 1200V due to slow stabilization in MPPT. In such case, the intelligent apparatus for voltage limitation suspends the voltage-limiting function, and the output voltage is restored, with an overall voltage still lower than 1500V.

As a result, a higher capacity of the photovoltaic modules connected in series may be connected to the direct side of the inverter for 1500V. For example, the capacity may be up to 1800V. The voltage is still effectively controlled within 1500V by the intelligent apparatus for voltage limitation. A cost is reduced. After grid-connection, a voltage of the system can be increased up to 1500V from 1200V in conventional technology. Hence, a PVIR of the system is improved.

Figure 8:
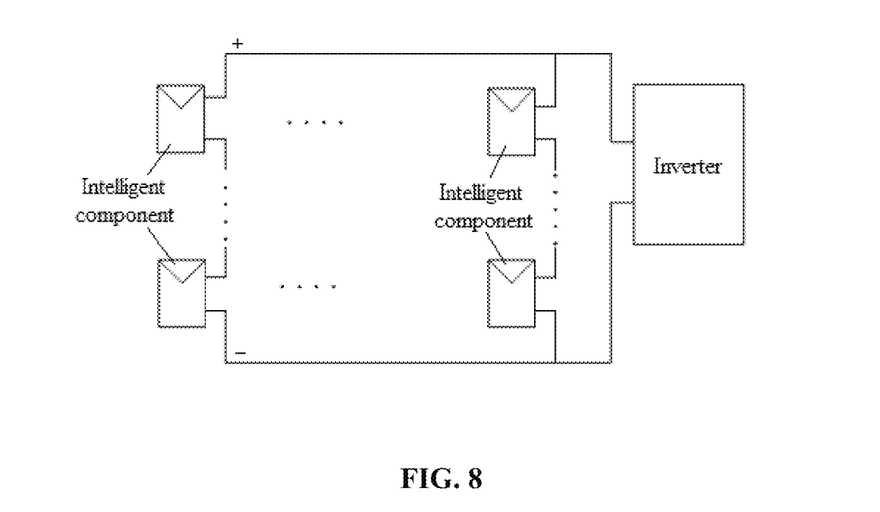
FIG. 8 is a schematic structural diagram of a photovoltaic power generation system including an intelligent component according to an embodiment of the present disclosure.

An intelligent junction box for voltage limitation is further provided according to another embodiment of the present disclosure. As shown in FIG. 8, the intelligent junction box including: multiple diodes, and the circuit for component voltage limitation according to any aforementioned embodiment. The photovoltaic cell connected to the circuit for component voltage limitation is a photovoltaic sub-string, and each diode is connected in anti-parallel with the corresponding photovoltaic sub-string.

A highest open circuit voltage is about 42 V in winter for a conventional photovoltaic module, which includes 60 photovoltaic-cell sheets and three photovoltaic sub-strings. A voltage of each photovoltaic sub-string is 14V. A photovoltaic module with including 72 photovoltaic-cell sheets is similar.

The power module 103 of the intelligent junction box for voltage limitation obtains power from the entire photovoltaic component and supplies power to the detection-and-control unit 101. The switch unit 102 is a controllable electronic switch, such as a MOSFET, an IGBT, a triode, a relay, or the like. FIG. 8 shows an example in which the controllable electronic switch is connected in parallel with one of the photovoltaic sub-strings.

Figure 5B:
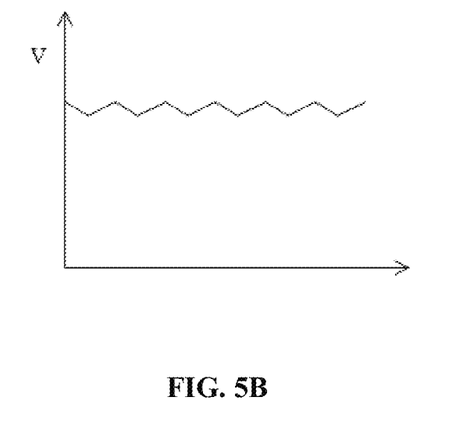

In case of a high voltage, the detection-and-control unit 101 controls the short of the switch actively. Theoretically, the voltage can be reduced by $\frac{1}{3}$. In a case that the switch is normally-on in limiting the voltage of the corresponding photovoltaic sub-string, the output voltage of the photovoltaic module is changed to $\frac{2}{3}$V. In a case the switch is controlled based on PWM in limiting the voltage of the corresponding photovoltaic sub-string, the output voltage of the photovoltaic module is changed into a saw-tooth wave with magnitude about $\frac{2}{3}$V (see FIG. 5A and FIG. 5B). V refers to the voltage of the module before the voltage of the corresponding photovoltaic sub-string is limited. In case of a low voltage, the detection-and-control unit 101 restores the photovoltaic sub-string from the limited voltage. As a whole, the maximum output of the entire photovoltaic module is limited when the circuit for component voltage limitation is provided in the intelligent junction box for voltage limitation. Further, granularity of the adjustment is smaller in a case that the switching unit 102 is provided for $\frac{1}{6}$ of the photovoltaic sub-string. An effect of the adjustment is better.

Rest of the structure and principles are same as those in the foregoing embodiment, and are not described again herein.

An intelligent component is further provided according to another embodiment of the present disclosure. The intelligent component includes a photovoltaic module, and the intelligent junction box for voltage limitation according to any aforementioned embodiment.

Multiple intelligent components are connected in series and parallel, and then connected to the direct-current side of the inverter. A system structure thereof is as shown in FIG. 8. A part of outputs within the intelligent component are limited in a case that a voltage-limiting function of the intelligent component is activated. Thereby, it is ensured that the direct voltage of the whole system does not exceed 1500V. When the inverter operates, the direct voltage of the system is pulled down, and each intelligent component suspends the voltage-limiting function. Thereby, the system generates power normally.

Rest of the structure and principles are same as those in the foregoing embodiment, and are not described again herein.

The embodiments of the present disclosure are described in a progressive manner, and each embodiment places emphasis on the difference from other embodiments. Therefore, one embodiment can refer to other embodiments for the same or similar parts.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but confirms to a widest scope in accordance with principles and novel features disclosed in the present disclosure.

The invention claimed is:

1. A circuit for component voltage limitation, wherein:
the circuit is connected to a photovoltaic-cell string, the photovoltaic-cell string comprises a plurality of photovoltaic cells connected in series, each of the plurality of photovoltaic cells is a photovoltaic-cell sheet, a photovoltaic sub-string, or a photovoltaic module; and
the circuit comprises:
a detection-and-control unit, configured to detect a parameter of the photovoltaic-cell string, and control operation of the switch unit according to the parameter of the photovoltaic-cell string; and
a switch unit, configured to control, according to control of the detection-and-control unit, at least one photovoltaic cell connected to the switch unit to operate in a voltage-limited mode, or a photovoltaic cell operating in the voltage-limited mode to resume a normal output.

2. The circuit according to claim 1, wherein the voltage-limited mode comprises:
a complete-short mode in which an output voltage is zero, or
a chopping mode in which an output voltage is controlled based on pulse width modulation (PWM).

3. The circuit according to claim 2, wherein the detection-and-control unit comprises a detection module and a controller; and
wherein:
the controller is a comparator provided with a hysteresis feedback, and is configured to control the switch unit between being normally-on and being turned off; or
the controller is a PWM generator or a PWM processor, and is configured to control the switch unit among being normally-on, being on or off based on PWM, and being turned off.

4. The circuit according to claim 3, wherein the switch unit comprises a switch; and
wherein:
a quantity of the at least one photovoltaic cell is one, and the switch is connected in parallel with the at least one photovoltaic cell; or
the at least one photovoltaic cell is a plurality of photovoltaic cells connected in series, and the switch is connected in parallel with the plurality of photovoltaic cells connected in series.

5. The circuit according to claim 3, wherein:
a quantity of the at least one photovoltaic cell is n, the switch unit comprises n switches, and n is a positive integer greater than 1; and
the n switches and the at least one photovoltaic cell are in a one-to-one correspondence, and each of the n switches is connected in parallel to a corresponding one of the at least one photovoltaic cell.

6. The circuit according to claim 3, further comprising:
a power module, configured to power the detection-and-control unit, wherein:
the power module extracts power from the photovoltaic-cell string, from a part of the photovoltaic-cell string, or from outside.

7. The circuit according to claim 2, wherein the switch unit comprises a switch; and
wherein:
a quantity of the at least one photovoltaic cell is one, and the switch is connected in parallel with the at least one photovoltaic cell; or
the at least one photovoltaic cell is a plurality of photovoltaic cells connected in series, and the switch is connected in parallel with the plurality of photovoltaic cells connected in series.

8. The circuit according to claim 2, wherein:
a quantity of the at least one photovoltaic cell is n, the switch unit comprises n switches, and n is a positive integer greater than 1; and
the n switches and the at least one photovoltaic cell are in a one-to-one correspondence, and each of the n switches is connected in parallel to a corresponding one of the at least one photovoltaic cell.

9. The circuit according to claim 2, further comprising:
a power module, configured to power the detection-and-control unit, wherein:
the power module extracts power from the photovoltaic-cell string, from a part of the photovoltaic-cell string, or from outside.

10. The circuit according to claim 1, wherein the parameter of the photovoltaic-cell string is:
a voltage, a current, or temperature of the photovoltaic-cell string, or
a voltage, a current, or temperature of the at least one photovoltaic cell.

11. The circuit according to claim 10, wherein the switch unit comprises a switch; and
wherein:
a quantity of the at least one photovoltaic cell is one, and the switch is connected in parallel with the at least one photovoltaic cell; or
the at least one photovoltaic cell is a plurality of photovoltaic cells connected in series, and the switch is connected in parallel with the plurality of photovoltaic cells connected in series.

12. The circuit according to claim 10, wherein:
a quantity of the at least one photovoltaic cell is n, the switch unit comprises n switches, and n is a positive integer greater than 1; and
the n switches and the at least one photovoltaic cell are in a one-to-one correspondence, and each of the n switches is connected in parallel to a corresponding one of the at least one photovoltaic cell.

13. The circuit according to claim 10, further comprising:
a power module, configured to power the detection-and-control unit, wherein:
the power module extracts power from the photovoltaic-cell string, from a part of the photovoltaic-cell string, or from outside.

14. The circuit according to claim 1, wherein the switch unit comprises a switch; and
wherein:
a quantity of the at least one photovoltaic cell is one, and the switch is connected in parallel with the at least one photovoltaic cell; or
the at least one photovoltaic cell is a plurality of photovoltaic cells connected in series, and the switch is connected in parallel with the plurality of photovoltaic cells connected in series.

15. The circuit according to claim 1, wherein:
a quantity of the at least one photovoltaic cell is n, the switch unit comprises n switches, and n is a positive integer greater than 1; and the n switches and the at least one photovoltaic cell are in a one-to-one correspondence, and each of the n switches is connected in parallel to a corresponding one of the at least one photovoltaic cell.

16. The circuit according to claim 1, further comprising:
a power module, configured to power the detection-and-control unit, wherein:
the power module extracts power from the photovoltaic-cell string, from a part of the photovoltaic-cell string, or from outside.

17. An intelligent apparatus for voltage limitation, comprising:
the circuit for component voltage limitation according to claim 1,
wherein a photovoltaic cell connected to the circuit for component voltage limitation is the photovoltaic module.

18. An intelligent junction box for voltage limitation, comprising:
a plurality of diodes, and
the circuit for component voltage limitation according to claim 1;
wherein a photovoltaic cell connected to the circuit for component voltage limitation is a photovoltaic sub-string; and
wherein each of the plurality of diodes is connected in anti-parallel with a corresponding one of the photovoltaic sub-string.

19. An intelligent component, comprising:
a photovoltaic module, and
the intelligent junction box for voltage limitation according to claim 18.

* * * * *